United States Patent
Belotserkovsky (12)

(10) Patent No.: US 6,179,918 B1
(45) Date of Patent: *Jan. 30, 2001

(54) SILICONE COAT WEIGHT MEASURING AND CONTROL APPARATUS

(75) Inventor: Edward Belotserkovsky, San Francisco, CA (US)

(73) Assignee: Honeywell International Inc., Morristown, NJ (US)

( * ) Notice: Under 35 U.S.C. 154(b), the term of this patent shall be extended for 0 days.

This patent is subject to a terminal disclaimer.

(21) Appl. No.: 09/196,862

(22) Filed: Nov. 20, 1998

(51) Int. Cl.$^7$ ........................................................ B05C 1/00
(52) U.S. Cl. .................... 118/665; 118/688; 118/689; 118/413; 118/419
(58) Field of Search ..................................... 118/665, 679, 118/688, 689, 712, 413, 419; 250/339.12, 339.11; 356/381, 382

(56) References Cited

U.S. PATENT DOCUMENTS

| | | |
|---|---|---|
| 4,006,358 | 2/1977 | Howarth . |
| 4,957,770 | 9/1990 | Howarth . |
| 5,338,361 | 8/1994 | Anderson . |
| 5,455,422 | 10/1995 | Anderson . |
| 5,795,394 | 8/1998 | Belotserkovsky . |

*Primary Examiner*—Richard Crispino
*Assistant Examiner*—George R. Koch, III
(74) *Attorney, Agent, or Firm*—Burns Doane Swecker & Mathis

(57) ABSTRACT

A sensor and a method for determining the coating weight of a coating material containing silicone on a substrate is described. The determined coating weight is insensitive to changes in the amount of substrate material underlying the coating. Signals from the sensor may be used in the control of a coating mechanism to provide a coating having a uniform weight.

17 Claims, 4 Drawing Sheets

FIG._1B
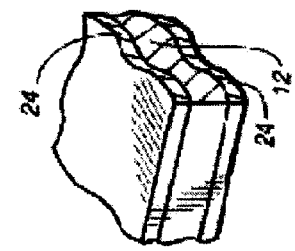
FIG._1C
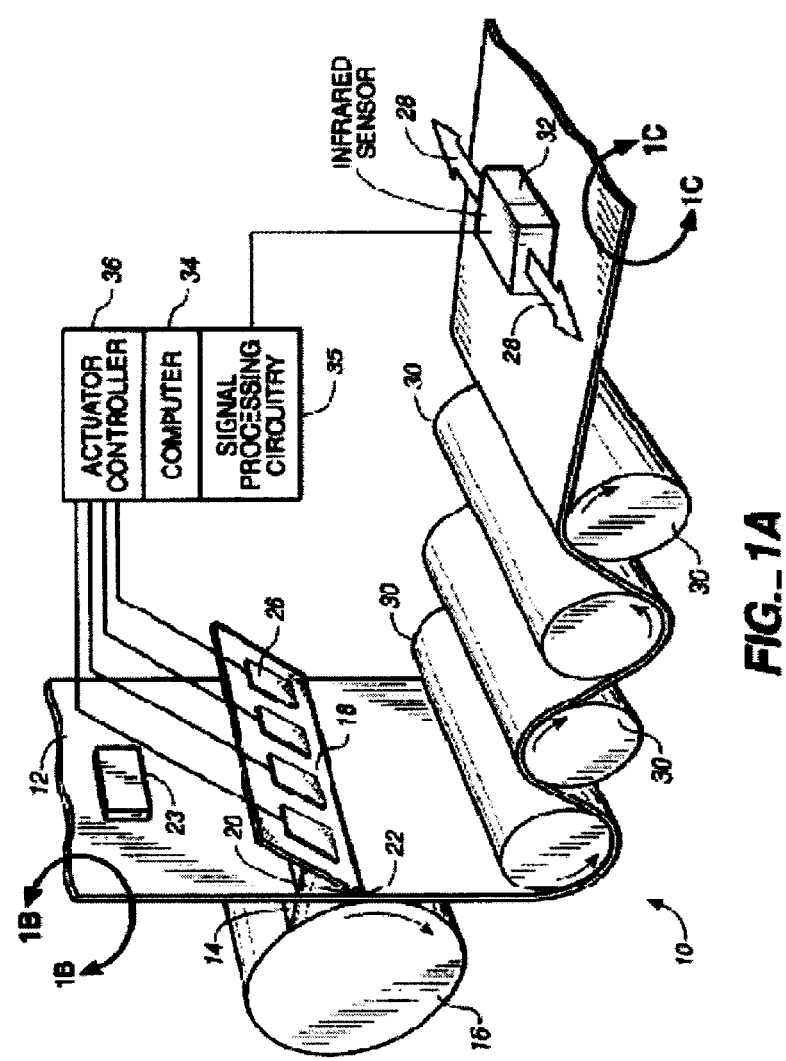
FIG._1A

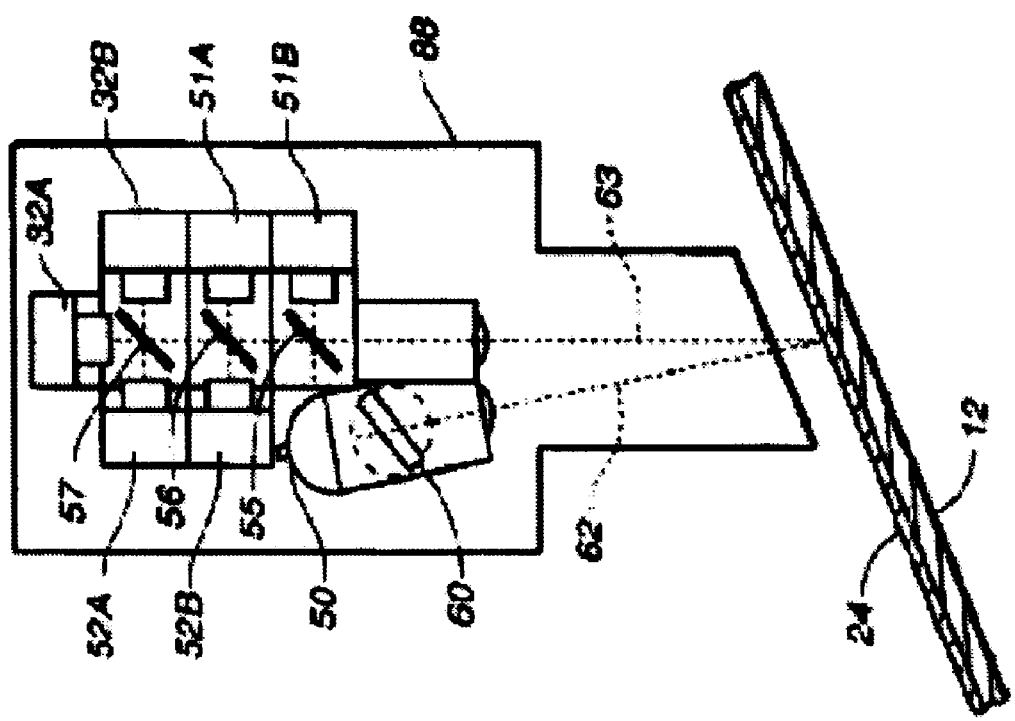
FIG._2

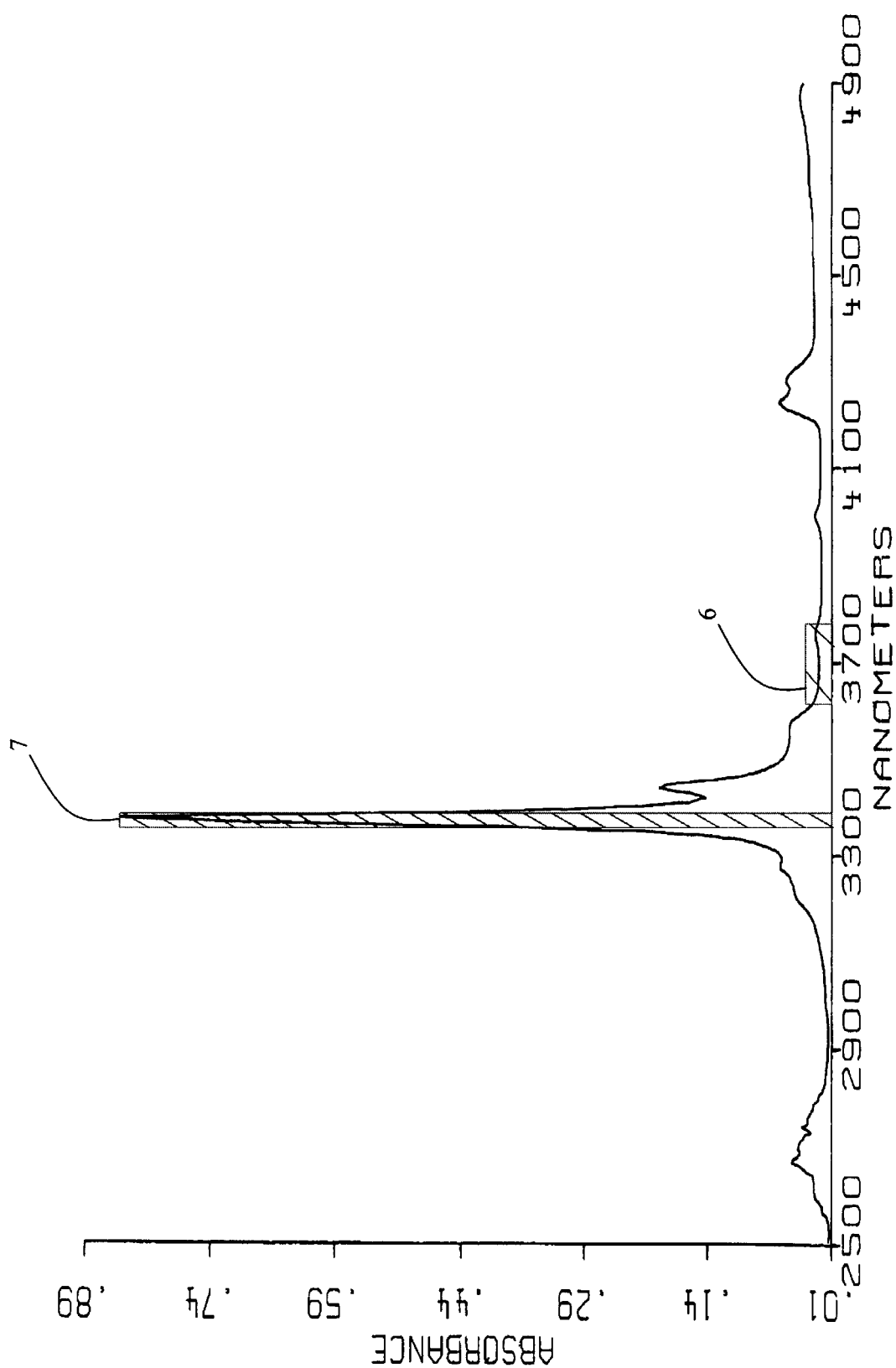
FIG._3

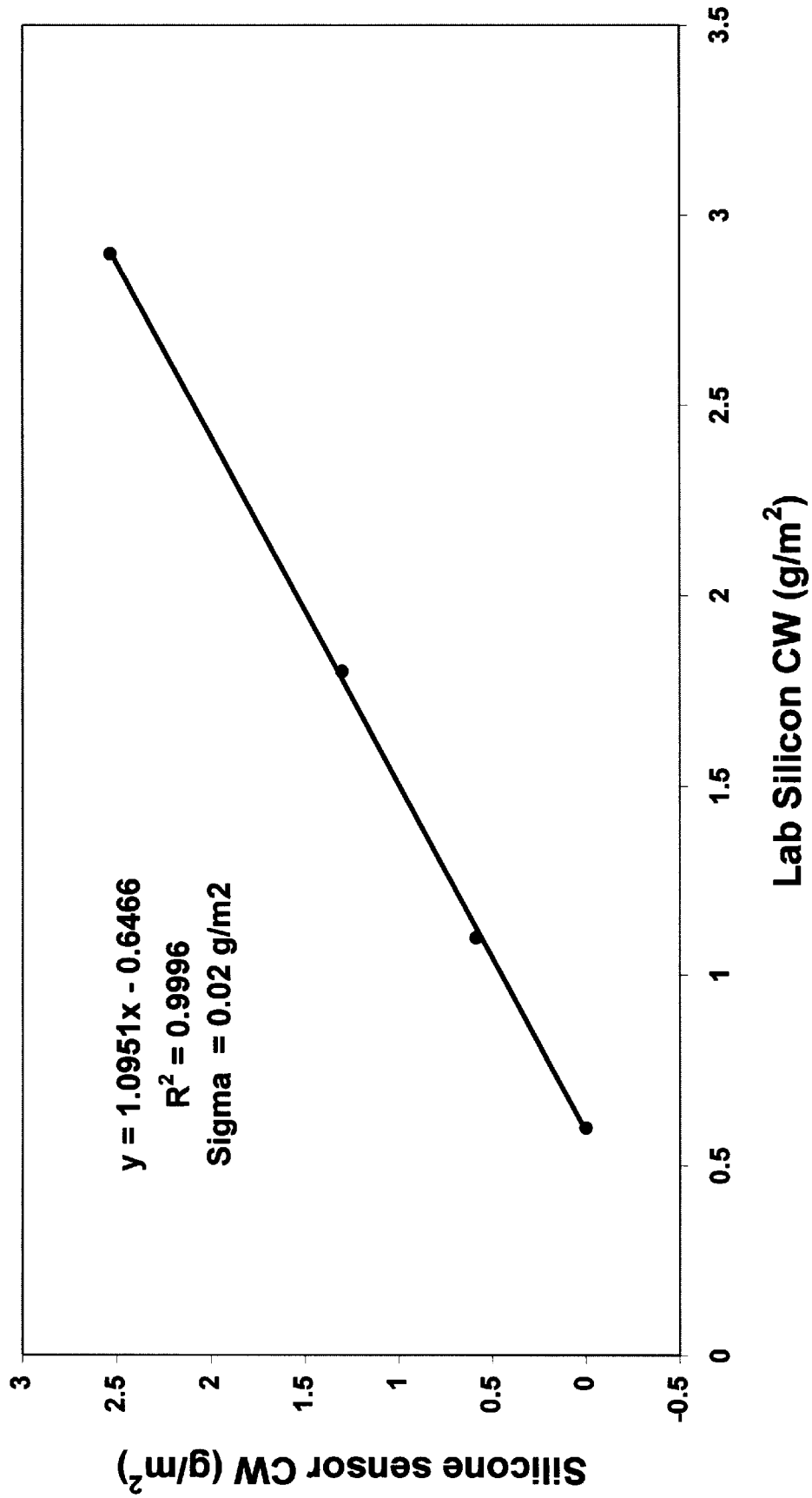
FIG._4

SILICONE COAT WEIGHT MEASURING AND CONTROL APPARATUS

FIELD OF THE INVENTION

This invention relates to apparatuses and methods for measuring and controlling the amount of a coating applied on paper sheet or other objects, and in particular, to an apparatus and method wherein the coat weight of a silicone coating on a moving paper sheet is monitored and regulated while being applied to the sheet.

BACKGROUND OF THE INVENTION

In the process of papermaking, it is often desirable to coat a paper sheet (called a "base sheet") with materials which can impart special properties to a paper, such as heat-resistance, non-stick properties, hydrophobic properties, or low-friction properties. For some time, silicone has been the material of choice to provide these types of paper properties. For example, silicone coatings are commonly used for materials such as double-sided tape, self-adhesive stamps, adhesive-backed rubber gaskets, and waterproof paper.

Unlike many other coatings, which may consist of as many as ten different types of materials, silicone is typically applied alone, to a pre-applied barrier/bonding layer. The barrier/bonding layer prevents the silicone from being absorbed into the underlying paper, and provides a bonding surface for the silicone molecules, which typically lie at the surface of the paper.

The silicone material my not be the only layer applied to the paper, however. A number of previous coating materials may have already been applied to the paper, prior to the application of the silicone. These non-silicone coating materials are comprised of a number of coating components which can be broadly classified as pigments, binders, and additives, almost always as aqueous dispersions. Some common pigments include clay, calcium carbonate ($CaCO_3$), barium sulfate, and titanium dioxide ($TiO_2$). Generally speaking, clay has been the most common pigment, although $CaCO_3$ and PCC (precipitated calcium carbonate) are becoming more common. Various formulations of latexes are commonly used for binders to hold the pigment or additive particles together and to bond them to the paper. A typical, non-silicone coating formulation includes 80% to 90% pigment, 3% to 10% latex, with the remainder consisting of additives or other components.

Coating materials, both silicone and non-silicone based, may be applied in the paper mill itself. Papermaking and coating techniques for silicone, and other materials are well known in the art and are described, for example, in Pulp and Paper Manufacture, Vol. III (Papermaking & Paperboard Making), R. MacDonald, Ed., 1970, McGraw Hill and Handbook for Pulp & Paper Technologists, G. A. Smook, 2nd Ed., 1992, Angus Wilde Publications. Alternatively, previously manufactured paper may be supplied to the coating machine, called a "coater", from large rolls of paper sheet. In either event, the paper is usually supplied to the coater in sheets that are on the order of 10 feet or more in width measured along the "cross-direction" (i.e., the direction transverse to the direction of movement of the paper along the papermaking and/or coating machine).

Uniformity of coating "basis weight" or coat weight (i.e., the mass of the coating material on a unit of surface area of the sheet) is often necessary or desirable for various reasons. Particularly for silicone coatings, the expense of this material makes efficient and non-wasteful use of the coating very important. Accordingly, the manufacturer will want to precisely monitor the coating and control the application of such coating to apply as uniform a coating as possible. In some cases, the evenness of the coating must be controlled within a fraction of a gram/m². However, because of the lateral extent of the sheet in the cross-direction (10 feet or more) and the requirement of accurately and evenly applying a coating to such sheets, rather complex coaters have been designed and manufactured.

Local variations in blade pressure and paper thickness, and possibly other factors, if not compensated for, will tend to produce uneven coatings. Therefore, it will be appreciated from the foregoing that the ability to measure the amount of coating material on the coated sheet, and to control the pressure of the blade against the sheet at a plurality of cross-directional slice positions during the coating procedure based upon such measurements will also be important to the papermaker.

Numerous schemes have been attempted to measure and control the amount of coating applied to a sheet. One of the most difficult aspects of the coating control process is obtaining an accurate measurement of the amount of coating applied to a sheet, particularly when the coating amounts must be measured to an accuracy of fractions of a gram/m².

In one such scheme, a sheet basis weight sensor and a sheet moisture sensor are disposed upstream in the papermaking process before the coater. The basis weight sensor measures the total amount of material in the sheet in terms of mass per unit surface area. Thus, the measured basis weight includes both paper fibers and moisture absorbed by the fibers. Known basis weight sensors utilize the transmission of beta rays through the sheet to determine the basis weight of such sheet. The moisture content of the sheet may be determined, for example, by known infrared moisture sensors which similarly determine the moisture content of the sheet in terms of the mass of water in the sheet per unit surface area of the sheet. Additional basis weight and moisture sensors are then positioned at a point downstream of the coater after the coating process.

The amount of fiber forming the sheet can be determined by subtracting the amount of moisture from the basis weight of the uncoated sheet. Similarly, by subtracting the moisture content of the coated sheet from the basis weight of the coated sheet, the combined amount of coating material and paper fiber can be determined. Finally, by subtracting the amount of fiber in the uncoated sheet from the measurement of combined coating and fiber basis weight in the coated sheet, the basis weight of the coating applied to the sheet is determined. Based upon these measurements of coat weight at each slice across the width of the sheet, the system process control computer can then compare such measurements with a predetermined desired coat weight value and develop signals to control the coating machine to achieve the desired coat weight across the entire width of the sheet.

Unfortunately, the above-described method is not completely satisfactory since it requires four relatively expensive sensors (i.e., a moisture and basis weight sensor disposed adjacent to the uncoated sheet and additional moisture and basis weight sensors disposed adjacent to the coated portion of the sheet) for determining the basis weight of the coating material. Moreover, the error inherent in the measurement of each of these four sensors may propagate additively through the mathematical calculations necessary to determine coat weight, thereby resulting in a less than ideal measurement of coat weight.

Another scheme for measuring the amount of coating material applied to a sheet requires the irradiation of the coated sheet with very high energy x-rays. Such high energy x-rays excite the atoms in the coated sheet material so that such atoms fluoresce. The fluorescing atoms emit x-rays having wavelengths unique to the elements in the coating. Thus, by tuning an x-ray sensor to one or more wavelengths uniquely characteristic of the elements in the coating material, the papermaker can deduce the amount of coating material by the intensity of the fluorescence at the characteristic wavelengths.

Unfortunately, the fluorescence technique is also not completely satisfactory in many instances. For example, the fluorescing atoms emit only low intensity x-rays, thus, this technique produces a relatively low signal to noise ratio. Therefore, relatively long periods of time must elapse before a statistically significant signal can be accumulated by the x-ray detector. Moreover, the high energy exciting x-rays, and the x-rays resulting from the fluorescence of the coated sheet, are dangerous to papermill personnel.

In yet another technique, portions of the sheet are irradiated with x-rays, and the intensity of the x-rays transmitted through the sheet is detected. However, x-rays are absorbed by the mineral filler material frequently used in paper sheet, the wood pulp fibers and the moisture in the sheet. Accordingly, since the transmission of x-rays through the sheet is not solely responsive to the coating material, sensors must be positioned before and after the coater, and the difference in transmission of the x-rays though the coated and uncoated portions of the sheet determined and related to the amount of coating material applied to the sheet. Again, however, this technique suffers from the deficiency that multiple relatively expensive x-ray sources and sensors are required, the error inherent in measurements made by each sensor may additively contribute to the error in the determined amount of coating, and the use of x-rays is, of course, potentially dangerous to papermill personnel.

One further problem with all these systems, if used to measure silicone coatings, is that the silicone coatings are typically hundreds of times smaller (in CW) than the basis weight. Thus, even the tiniest error in the basis weight can be similar in magnitude to the silicone coat weight, making the silicone weight hard to separate from the noise in the basis weight signal.

In any event, a number if previous systems have been developed for measuring coating properties. Commonly assigned U.S. Pat. No. 5,795,394 describes an apparatus and method which can determine the amount of a coating material on a substrate using measurements of radiation reflected from the substrate, or the transmission of radiation through the substrate, at least at two separate wavelength regions of the electromagnetic spectrum. The system described in this patent is optimized for $CaCO_3$ measurements, and the selected wavelength regions are not optimal for silicone measurement.

Commonly assigned U.S. Pat. No. 4,957,770 discloses a sensor and method for determining the basis weight of a coating material by measuring radiation from the coating material in a similar manner to U.S. Pat. No. 5,795,394, described above. The sensor described in U.S. Pat. No. 5,795,394, measures latex concentration in the coating material, and the selected wavelength regions are not suitable for silicone.

In fact, the Applicant's are not aware of another system in which IR radiation is used to measure silicone coating weight, in any frequency range.

SUMMARY OF THE INVENTION

The invention is directed to on-line non-contact paper coat weight measurements for coatings comprising silicone. The invention is based in part on the discovery that the infrared region between about 3.36 to 3.38 microns is substantially free from interference from water, $CaCO_3$, cellulose, clay and other coating pigments and paper fillers, that provides high accuracy and reliability of paper coat weight measurements. Interference from latex at the selected measure wavelength may be eliminated by referencing the post-silicone-coating measurements to pre-silicone-coating measurements.

The present invention includes an apparatus and method which can determine the amount of a coating material on a substrate using measurements of radiation reflected from the substrate, or the transmission of radiation through the substrate, at least at two separate wavelength regions of the electromagnetic spectrum. The apparatus and method are primarily, but not exclusively, intended for on-line coating measurements of a moving paper sheet using infrared radiation. Accordingly, for the sake of simplicity, the present invention will be described in the papermaking context. However, it is to be understood that the substrate may be sheet materials other than paper, such as plastic, or even wherein the substrate may not be in sheet form.

In papermaking, the infrared coating sensor of the present invention may be scanned back and forth in the cross-direction of a moving coated sheet, to thereby provide a measurement of the basis weight of the coating on the base sheet at various positions along the length and width of the sheet. The sensor is designed to automatically compensate the coating measurement for the effects of changes in the basis weight and moisture content of the base sheet on infrared transmission through or reflectance from the sheet. Therefore, the coat weight measurement remains highly accurate as the sensor is scanned across the moving sheet, even if the basis weight of the base sheet or its moisture content are not uniform across the width and length of the sheet.

The infrared coating sensor of the present invention includes a source of infrared radiation. A beam of infrared radiation is transmitted from this infrared source toward the moving sheet. When the beam reaches the sheet, it first passes through the coating material and then into the base paper sheet. A portion of this infrared energy will be transmitted through the sheet or absorbed by the sheet. Also, some of the infrared energy, after entering the base sheet, will be reflected back in the general direction of the infrared source. The infrared beam contains a broad range of wavelengths. However, infrared radiation at certain wavelengths is preferentially absorbed by the coating and/or the base sheet itself.

The coating sensor also includes an infrared receiver section. This receiver section may be positioned on the opposite side of the sheet from the infrared source, and thereby measure the intensity of the transmitted infrared beam. Alternatively, the infrared receiver section of the sensor may be positioned on the same side of the sheet as the infrared source, to thereby measure the intensity of the reflected portion of the beam. In either case, the receiver section comprises a beam splitter, at least two infrared detectors and an infrared band pass filter associated with each detector. The beam splitter directs a portion of the infrared beam toward each of the two or more detectors. A separate infrared band pass filter is positioned before each detector. In this way, each of the infrared detectors measures the intensity of only the portion of the infrared beam spectrum which falls within the pass band of the associated filter.

One of the two infrared band pass filters only passes infrared radiation having wavelengths in a selected region of the infrared spectrum wherein the infrared beam is absorbed or scattered by the underlying base sheet of paper, but is only very weakly absorbed by the coating material. This first region of the spectrum is called the "reference" region, and the associated detector is called the "reference" detector. The output signal from reference detector is, therefore, primarily dependent upon absorption or scattering by the base sheet. For example, when the detected infrared energy has been transmitted through the sheet from one side of the sheet to the other, the amount of absorption will be dependent upon the basis weight of the base paper sheet. Moreover, even if the receiver section and the infrared source are positioned on the same side of the sheet, so that the receiver section detects only reflected infrared radiation, then the output of the reference detector will still be sensitive to changes in the basis weight of the sheet. This is because the infrared radiation is only partially reflected at the surface of the base sheet. Much of the infrared radiation will penetrate into the sheet, with an increasing proportion of the total beam being reflected as it penetrates deeper into the sheet and/or encounters more sheet material. Thus, all else remaining constant, a higher basis weight sheet will reflect more infrared energy than a lower basis weight sheet. With a lower basis weight sheet, more of the infrared energy will be transmitted through the sheet.

A second band pass filter is associated with the second infrared detector and passes only wavelengths in a region of the infrared spectrum which are strongly absorbed by silicone. This second region of the spectrum, called the "measure" region, is also chosen such that the average absorption of infrared radiation in this region by the base sheet is equivalent to the average absorption by the base sheet of the infrared radiation in the reference region. Accordingly, the measure and reference band pass filters are chosen such that their pass bands correspond to regions of the infrared spectrum which are absorbed to the same extent by the underlying base paper sheet. The detector associated with the "measure" region of the spectrum is called the "measure" detector.

According to the present invention, the ratio (or difference) of the output signals from the reference and measure detectors is determined. Since, as previously mentioned, radiation having wavelengths in the pass bands of both the measure and reference band pass filters is equally absorbed by the base paper sheet, the ratio (or difference) of the signals from the measure and reference detectors will be indicative of the amount of the selected component in the coating. Since, in the usual case, the selected component will be mixed into the coating formula in a known, fixed proportion, the determined amount of the selected component can be correlated with a corresponding amount of coating material. Moreover, because the absorption of the measure and reference wavelengths by the sheet is equal or "balanced", the ratio of (or difference between) the signals from the measure and reference detectors will be independent of the basis weight of the base sheet.

Signals from the coating sensor can be transmitted to a process control computer which performs the above-described mathematical calculations to provide a measurement of amount of coating on the sheet. The computer compares this measurement with a previously entered desired coating amount. The computer then generates a control signal that can be used to regulate coating blade control actuators, and in turn, the amount of coating applied to the base sheet at each cross-directional position. Should conditions arise during the coating procedure which require an adjustment of the coater blade at any cross-directional position to maintain the applied coating at the preselected amount, such an adjustment can be automatically made by transmitting the appropriate signals from the process control computer to one or more blade actuators.

With the present invention, a high degree of uniformity in the thickness and/or basis weight of the coating applied to paper sheet is achievable using a single, safe and highly accurate coating sensor.

BRIEF DESCRIPTION OF THE DRAWINGS

FIG. 1a is a simplified schematic perspective view of a paper coating operation utilizing a scanning reflectance-type infrared coating sensor according to the present invention;

FIG. 1b is an enlarged view of the uncoated portion of the sheet of FIG. 1a;

FIG. 1c is an enlarged view of the coated portion of the sheet of FIG. 1a;

FIG. 2 is a simplified schematic cross-sectional view of a detector assembly that includes the reflectance-type infrared coating sensor of FIG. 1a;

FIG. 3 illustrates an infrared absorption spectrum for the type of silicone coating applied to paper; and FIG. 4 is a calibration curves for a silicone sensor vs. lab coat weight.

DETAILED DESCRIPTION OF THE PREFERRED EMBODIMENT

FIG. 1a illustrates, a paper sheet coating system 10. As illustrated in this figure, an uncoated sheet of paper 12 is drawn through a supply of coating material 14 contained between a backing roll 16 and a blade 18. An exit slot 20 for the sheet 12 is formed between the roll 16 and the adjacent edge of the blade 22, so that the thickness of the coating on the paper 12 immediately after it exits the slot 20 is determined by the distance and pressure between the blade edge 22 and the roll 16.

Actuators 26 are mounted on the blade 18 at fixed intervals and control the flexion of the blade 18 in the vicinity of each actuator 26 such that, as the actuators 26 move the blade 18 toward and away from the roll 16, the coating material on the sheet 24 is made progressively thinner and thicker, respectively. The actuators 26 are preferably spaced at 3 or 6 inch intervals along the blade 18. As previously mentioned, each 3 or 6 inch interval surrounding each of the actuators 26 is called a "slice".

After the sheet 12 exits the coating thickness control slot 20, the coated sheet 12 passes over a number of heated drums 30 which dry the coating 24. The dried coated sheet 12 then passes under a reflectance-type infrared coat weight sensor 32 which is described in greater detail below.

The sensor 32 is driven back and forth across the width of the sheet 12, in the direction of the arrows 28, in a scanning motion so that it is able to measure the amount of infrared radiation reflected from the sheet 12 at various slice positions across the width and length of the moving sheet 12.

Signals from this sensor 32 are then transmitted, via signal processing circuitry 35, to the system process control computer 34 where the signals are time-wise demultiplexed such that these sensor signals can be related to particular slice positions across the width of the sheet 12. As also described below, the computer 34 then performs various computations, based upon these signals, to determine the basis weight of the coating 24 at each slice. The computer 34 compares the measured coat weight for each slice to a predetermined desired value and instructs the actuator controller 36 to develop control signals which cause the actuators 26 to flex the blade 18 at each slice position as needed to provide the desired coat weight for each slice. Usually, a uniform coat weight will be the desired goal.

The infrared coating, weight sensor 32 of FIG. 1a is illustrated in greater detail in FIG. 2. This sensor 32 is used to measure the amount of the coating material 24 applied to the base paper sheet 12, and automatically compensates this measurement for the affect of infrared absorption by the sheet 12 resulting from changes in the basis weight and moisture content of the sheet 12.

The sensor 32 is part of a detector assembly 88 that comprises a tungsten-halogen source 50 of continuous wave radiation in the visible and infrared regions and a detector assembly of six infrared detectors that are housed in a temperature-controlled enclosure. The broad-band infrared source energy 50 is directed at the sheet 12 at an angle that minimizes sensitivity to sheet flutter and surface characteristics. The diffused reflection mode is preferred. The angle typically ranges from about 10° to about 25° from normal. The detector assembly comprises silicone sensor, clay sensor, and moisture sensor. The silicone sensor includes silicone measure filter/detector 32A and silicone reference filter/detector 32B. The clay sensor includes clay measure filter/detector 51A and clay reference filter/detector 51B. The moisture sensor includes moisture measure filter/detector 52A and moisture reference filter/detector 52B. The energy reflected from the sheet is wavelength-analyzed by passing the beam through the beam splitters 55, 56, and 57 and the appropriate filters to the individual detectors. This configuration of the optical analyzer comprising the beam splitters, filters, and detectors insures that all detector signals originate from the same location on the sheet, so that at any given time all of the information needed for accurate measurement is available.

Precise and accurate measurements by the silicone sensor is based, in part, on the correlation of silicone concentration to the intensity absorption of silicone at about the 3.36 $\mu$m region. While this peak is relatively weak compared to other, obvious absorption peaks for silicone, it was found, after significant experimentation, that smaller (but not weak) absorption peaks provide better data about the coating material being measured. This is because, for a chosen radiation source level, extremely strong peaks prevent any significant penetration into the coating, and reduce specular reflection back to the radiation detectors. Some coating penetration is required however, to accurately reflect the body of the coating, not just a small surface layer. Further, strong absorption peaks impliedly reduce the specular reflection signal received by the radiation detector.

Of course, if the absorption is too weak, it will be difficult to separate coating weight data from signal noise, since most of the signal will pass right through the coating, and possibly also the base material. Consequently, weak peask were avoided as well. The 3.36 absorption beak for silicone provides a good balance between the above two competing factors.

For measuring silicone, the preferred center wavelength for the pass bands of the measure and reference band pass filters ranges from about 3.36 $\mu$m to 3.38 $\mu$m, and about 3.60 $\mu$m to 3.80 $\mu$m, respectively. The band width for each of these filters is preferably about 0.15 $\mu$m, but can be wider or narrower as is needed to obtain the desired signal strength and balance at the detectors. The ratio of the detectors' output signals of measurement and reference channels, is proportional to the paper coat weight value.

The silicone sensor is preferably configured as a four-channel sensor or six-channel sensor. The more preferred configuration, as shown in FIG. 2, is the six-channel sensor, which measures $CaCO_3$, silicone, clay, and moisture. A preferred four-channel version measures silicone and clay. The detector assembly further includes a conventional infrared energy modulator 60 which comprises, for example, a rotating light chopper, operating at 170 Hz, for example, which provides a high level of infrared energy modulation. The light chopper is preferably configured as a hollow square prism that is opened from two opposite sides. As it rotates, the light chopper intercepts the full width of the 25 mm diameter beam from the source's parabolic reflector. This allows the use of a low-wattage tungsten-halogen source, ensuring long, stable lamp life. The small filament size in turn ensures that the spot size (the area measured on the sheet) is small, approximately 20 mm diameter. The silicone sensor preferably employs an internal optical (reflecting) standard which is entirely self-contained, therefore the sensor does not interfere with the sheet and does not have to travel off-sheet to perform standardization.

The infrared energy modulator 60 modulates at a known frequency the amount of infrared radiation that impinges upon the sheet 12 from the infrared source 50. Thus, the output of each infrared detector is also modulated at the same known frequency as the incident infrared beam 62. Moreover, since the detector outputs are directly dependent upon the reflected portion 63 of the modulated incident beam 62, the phase of the detector outputs will be dependent upon the phase of the modulated beam 62. However, infrared energy originating from the base paper sheet 12, the coating on the sheet 24, and other external sources (not shown), will also reach all the detectors. Thus, each detector signal will include both an AC and DC component.

The output of each of the detectors (both measure and reference) is transmitted to the signal processing circuitry 35 (FIG. 1a). This circuitry is designed to filter out the DC component of the detector signals. The filtered AC detector signals are then passed on to a phase synchronous demodulation circuit included within the signal processing circuitry 35. The purpose of the phase synchronous demodulator is to filter out changes in the detector signals which are not caused by the varying infrared absorption of the base sheet 12 or the coating material 24 applied to the base sheet 12.

With respect to the silicone sensor, the averaged amplitude of the demodulated signals from each detector, 32A and 32B is indicative of the amount of infrared radiation being reflected from various portions of the coated sheet within the pass bands of the filters associated with each detector, respectively. The demodulated and amplitude averaged detector signals are then measured by the signal processing circuitry, digitized and fed to the process control computer 34. The computer 34 computes the basis weight of the coating material 24 on the base sheet 12 utilizing the equations and techniques more fully described below.

FIG. 3 illustrates the infrared absorption spectrum for silicone and the pass bands for the reference 6 and measure 7 filters associated, respectively, with the reference and measure infrared detectors for the silicone sensor. The reference and measure filters are chosen such that the average absorption of infrared radiation by the base paper sheet 12 in their respective pass bands is equal, or as nearly equal as practical. In this way, the signals produced by the reference and measure detectors will be equal (or very nearly equal) for an uncoated sheet 12. The pass band of the measure detector filter is chosen to fall within a strong absorption peak (or transmission minimum) for silicone.

Accordingly, with a coated sheet, the output from the measure detector is indicative of infrared absorption caused by both the base paper sheet and the silicone component of the coating material.

Even at its absorption peak, however, silicone at typical concentrations only very weakly absorbs infrared radiation. Accordingly, the amount of signal attributable to the silicone coating component, from the measure detector 32A, is so low that the measure detector itself cannot practically be used to determine the amount of silicone encountered by the reflected infrared beam 63. It would be indistinguishable from signal changes caused by variations in other components of the sheet. Nevertheless, with the present invention, because the measure 32A and reference 32B detectors are equally sensitive to the underlying base paper sheet 12, the ratio of the magnitude of the reference signal to the magnitude of the measure signal yields a signal with good sensitivity to the silicone content in the coating material. Similarly, the difference in the magnitude of the reference and measure signals will also provide an indication of the silicone content in the coating material. Moreover, because the reference and measure signals are subject to the same major sources of error (e.g., background changes in sheet basis weight, moisture content and dust in the optical path), the ratio or difference between the measure and reference signals will provide a highly accurate indication of the amount of silicone overlying the base paper sheet, even if the phase synchronized demodulation filtering technique discussed above is not utilized.

When setting up the coat weight sensor 32, it is important to "balance" or equalize the absorption of infrared radiation by the base sheet 12 in the measure and reference pass bands. Known infrared band pass filters are made by coating a substrate with a series of dielectric coatings. The thicknesses of the dielectric coatings determine the center of the pass band for the filter. Accordingly, by varying the thicknesses of the dielectric films, filters can be made to have a pass band at any desired region of the infrared spectrum.

The signals from the reference and measure detectors can be used to mathematically calculate basis weight according to the following equation:

$$BW_C = A(I_{MES} - I_{REF}),\quad (1)$$

wherein:

$BW_C$=the basis weight of the coating material on the base sheet;

$I_{MES}$=the value of the output signal from the measure detector;

$I_{REF}$=the value of the output signal from the reference detector; and

A is a constant and is determined empirically and relate the various detector outputs to the coat weight. The value of the constant may be determined by well known curve fitting techniques. The values of $I_{MES}$, $I_{REF}$ are proportional to the reflectance of the infrared radiation by the coated sheet in the measure and reference pass bands, respectively.

Equation (1) relies upon the difference between the output signals from the reference and measure detectors to determine the basis weight of the coating material. However, it is also possible to determine the coat weight using ratios of these two signals:

$$BW_C = C(I_{MES}/I_{REF}) - 1)$$

C is an empirically determined constant which relates the various detector outputs to coat weight.

A computer (not shown) may be associated with the coat weight sensor 32 and dedicated solely to performing the basis weight calculations for each slice. However, many modern paper mills are highly automated and include a process control computer 34 (FIG. 1a). In these mills, the signals produced by the infrared coating sensor 32 of the present invention are preferably fed to the mill's central process control computer 34, via signal processing circuitry 35, for computation of the amount of coating material 24 being applied to the sheet 12 at each cross-directional slice location. Then, based upon these computations, the process control computer 34 can instruct the actuator controller 36 to develop signals to selectively activate the coating control blade actuators 26 mounted at each slice along the blade 18 to selectively alter the amount of coating material 14 applied to the base sheet 12 at each cross-directional location.

On the other hand, it may happen that silicone is also incorporated into the base sheet. In this situation, a secondary infrared sensor 23, similar or identical to the primary infrared sensor 32 described above, is positioned at a location in the paper coating process prior to the application of the coating material 14 to the base sheet. This secondary sensor is disposed adjacent to the uncoated base sheet and utilized to measure the amount of silicone in the base sheet in exactly the same manner as described above for the primary sensor. In this situation, the process control computer 34 receives signals from the secondary sensor, computes the amount of silicone incorporated into the base sheet, and subtracts this silicone measurement from the silicone measurement resulting from the signals supplied to the computer 34 by the primary coating sensor 32. The difference resulting from this subtraction is indicative of the amount of silicone in the coating material applied to the recycled base paper sheet. Coating control is then conducted in a manner identical to that previously described.

A similar procedure is required if the base sheet or a previous coating step applied latex to the sheet, since the latex will interfere with the silicone measurement. In this case, the latex signal from before coating will be subtracted from the silicone signal taken after coating.

Finally, as previously mentioned, if the silicone is a component in a coating material having a number of other chemical components such as CaCO3, dyes, fillers, etc., the amount of these materials may be determined inferentially from the silicone data. The non-silicone components are mixed together in precise, known and predetermined proportions with the silicone component of the coating material. Accordingly, by determining the amount of the silicone component overlying a sheet, the system process control computer can also determine the total amount of the entire coating material mixture on the sheet from the known proportions of the other components of the coating material to the silicone component.

The moisture and clay sensors operate in substantially the same way as the silicone sensor. For the moisture sensor, the preferred center wavelength for the pass bands of the measure and reference band pass filters ranges from about 1.89 $\mu$m to 1.95 $\mu$m and 1.70 $\mu$m to 1.86 $\mu$m, respectively. For the clay sensor, the preferred center wavelength for the pass bands of the measure and reference band pass filters ranges from about 2.20 $\mu$m to 2.25 $\mu$m and 2.08 $\mu$m to 2.30 $\mu$m, respectively.

Experimental

The silicone sensor as illustrated in FIG. 2 was tested at a paperboard mill. A 3.36 $\mu$m filter was used for the measurement channel and a 3.80 $\mu$m filter was used for reference channel. Before installation, aqueous silicone samples were prepared, and the coat weights of the samples were measured with the sensor in a laboratory for calibration. The sensor data was correlated with the lab bata, and is reproduced in the graph of FIG. 4. The linear relationship of the line through the points shown on the graph is the basis for the sensor calibration.

Although only preferred embodiments of the invention are specifically disclosed and described above, it will be appreciated that many modifications and variations of the present invention are possible in light of the above teachings and within the purview of the appended claims without departing from the spirit and intended scope of the invention.

The embodiments of the invention in which an exclusive property or right is claimed are defined as follows:

1. A coating system, comprising:

a sheet coating apparatus for applying a coating material that contains silicone to the surface of a moving uncoated sheet that comprises a base sheet, the coating apparatus including a metering element for regulating the amount of the coating material which remains on a coated sheet after a moving uncoated sheet passes by the metering element;

a first coating sensor disposed adjacent to the coated sheet and including a first radiation source disposed to direct a first beam of radiation into the coated sheet, and a first radiation receiver positioned to detect at least a portion of the first beam emerging from the coated sheet, the first receiver being configured to detect the amount of radiation in first and second separate wavelength regions of the infrared electromagnetic spectrum and to produce first and second signals therefrom, respectively indicative of the amount of detected radiation in the first and second regions, and wherein the first region is selected for radiation which is sensitive to the basis weight of the base sheet and the second region is selected for radiation which is approximately equally as sensitive as the radiation in the first region to the basis weight of the base sheet, but which is also sensitive to the silicone of the coating material, the sensitivity of the radiation in the first region to the silicone being different than the sensitivity of the radiation in the second region to the silicone and wherein the first region ranges from about 3.60 to 3.80 $\mu$m and the second region ranges from about 3.36 to 3.38 $\mu$m;

a computer operatively coupled to the first receiver for computing the amount of coating material on the sheet from the first and second signals, the computer producing a third signal indicative of the computed amount of silicone in the coating material; and at least one actuator, operatively coupled to the computer and to the metering element, for adjusting the metering element in response to the third signal to regulate the amount of the coating material on the base sheet.

2. The coating system as in claim 1, wherein the radiation is infrared radiation.

3. The coating system as in claim 2, wherein the moving coated sheet has silicone incorporated in the base sheet or a previously-applied coating thereof, the system further comprising;

a second coating sensor disposed adjacent to the uncoated sheet and including a second radiation source disposed to direct a second beam of radiation into the uncoated sheet, and a second radiation receiver positioned to detect at least a portion of the second beam emerging from the uncoated sheet, the second receiver being configured to detect the amount of radiation in third and fourth separate wavelength regions of the electromagnetic spectrum and to produce fourth and fifth signals therefrom, respectively indicative of the amount of detected radiation in the third and fourth regions, and wherein the third region is selected for radiation which is sensitive to the basis weight of the uncoated sheet and the fourth region is selected for radiation which is approximately equally as sensitive as the radiation in the third region to the basis weight of the uncoated sheet, but which is also sensitive to the silicone incorporated into the base sheet of the uncoated sheet, and wherein the computer is operatively coupled to the second receiver for computing a sixth signal based upon the fourth and fifth signals indicative of the amount of the silicone in the base sheet, and wherein the computer computes the amount of silicone in the coating material on the sheet from the third and sixth signals.

4. The coating system of claim 3, wherein the first region is the same as the third region and the second region is the same as the fourth region.

5. The coating system of claim 3 wherein the second radiation receiver is positioned to detect the intensity of at least a portion of the second beam that is transmitted through the uncoated sheet.

6. The coating system of claim 3 wherein the second radiation receiver is positioned to detect the intensity of at least a portion of the second beam that is reflected from the uncoated sheet.

7. The coating system of claim 3, further comprising a scanning mechanism, having the second sensor attached thereto, for scanning the second sensor back and forth along a line, and wherein the computer is programmed to determine the amount of silicone in the base sheet, or the previously-applied coating thereof, at various cross-directional positions of the sheet traversed by the scanning second sensor based upon the third and fourth signals.

8. The coating system as in claim 2, wherein the moving coated sheet has latex incorporated in the base sheet or a previously-applied coating thereof, the system further comprising;

a second coating sensor disposed adjacent to the uncoated sheet and including a second radiation source disposed to direct a second beam of radiation into the uncoated sheet, and a second radiation receiver positioned to detect at least a portion of the second beam emerging from the uncoated sheet, the second receiver being configured to detect the amount of radiation in third and fourth separate wavelength regions of the electromagnetic spectrum and to produce fourth and fifth signals therefrom, respectively indicative of the amount of detected radiation in the third and fourth regions, and wherein the third region is selected for radiation which is sensitive to the basis weight of the uncoated sheet and the fourth region is selected for radiation which is approximately equally as sensitive as the radiation in the third region to the basis weight of the uncoated sheet, but which is also sensitive to the silicone incorporated into the base sheet of the uncoated sheet, and wherein the computer is operatively coupled to the second receiver for computing a sixth signal based upon the fourth and fifth signals indicative of the amount of the silicone in the base sheet, and wherein the computer computes the amount of silicone in the coating material on the sheet from the third and sixth signals.

9. The coating system of claim 8, wherein the first region is the same as the third region and the second region is the same as the fourth region.

10. The coating system of claim 8 wherein the second radiation receiver is positioned to detect the intensity of at least a portion of the second beam that is reflected from the uncoated sheet.

11. The coating system of claim 8, further comprising a scanning mechanism, having the second sensor attached thereto, for scanning the second sensor back and forth along a line, and wherein the computer is programmed to determine the amount of silicone in the base sheet, or the previously-applied coating thereof, at various cross-directional positions of the sheet traversed by the scanning second sensor based upon the third and fourth signals.

12. The coating system of claim 1, further comprising a scanning mechanism, having the first sensor attached thereto, for scanning the first sensor back and forth along a line, and wherein the computer is programmed to determine the amount of silicone in the coating material on the sheet at various cross-directional positions of the sheet traversed by the scanning first sensor based upon the first and second signals.

13. The coating system of claim 12, further comprising a second scanning mechanism, having the second sensor attached thereto, for scanning the second sensor back and forth along a line, and wherein the computer is programmed to determine the amount of silicone in the base sheet at various cross-directional positions of the sheet traversed by the scanning second sensor based upon the third and fourth signals.

14. The coating system of claim 1, wherein the coating material comprises chemical components selected from the group consisting of $CaCO_3$, dyes, fillers, silicone and clay.

15. The coating system of claim 1 wherein the first radiation receiver is positioned to detect the intensity of at least a portion of the first beam that is transmitted through the coated sheet.

16. The coating system of claim 1 wherein the first radiation receiver is positioned to detect the intensity of at least a portion of the first beam that is reflected from the coated sheet.

17. The coating system of claim 1, wherein the uncoated sheet is paper, the first region is approximately centered around 3.8 $\mu$m and the second region is approximately centered around 3.36 $\mu$m.

* * * * *